US 8,566,429 B2

(12) United States Patent
Chung

(10) Patent No.: US 8,566,429 B2
(45) Date of Patent: Oct. 22, 2013

(54) FIRMWARE UPDATING SYSTEM AND METHOD FOR UPDATE THE SAME

(75) Inventor: Shih-Chiang Chung, Sanchong (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1690 days.

(21) Appl. No.: 12/007,083

(22) Filed: Jan. 7, 2008

(65) Prior Publication Data

US 2009/0064124 A1  Mar. 5, 2009

(30) Foreign Application Priority Data

Sep. 4, 2007 (TW) ................................ 96132961 A

(51) Int. Cl.
G06F 15/177 (2006.01)
(52) U.S. Cl.
USPC ........... 709/221; 709/201; 709/203; 709/217; 709/218
(58) Field of Classification Search
USPC .................. 709/221, 201, 203, 217, 218
See application file for complete search history.

(56) References Cited

U.S. PATENT DOCUMENTS

| 6,560,703 | B1 * | 5/2003 | Goodman | 713/2 |
|---|---|---|---|---|
| 7,971,199 | B1 * | 6/2011 | Chen | 717/168 |
| 2004/0030877 | A1 * | 2/2004 | Frid | 713/1 |
| 2005/0160418 | A1 * | 7/2005 | Jeong et al. | 717/173 |
| 2006/0031664 | A1 | 2/2006 | Wilson et al. | |
| 2006/0259902 | A1 * | 11/2006 | Lin | 717/168 |
| 2006/0265696 | A1 * | 11/2006 | Mayfield et al. | 717/137 |
| 2007/0260790 | A1 * | 11/2007 | Chen et al. | 710/110 |
| 2009/0273663 | A1 * | 11/2009 | Yoshida | 348/43 |
| 2010/0199272 | A1 * | 8/2010 | Mahajan et al. | 717/171 |
| 2011/0173603 | A1 * | 7/2011 | Nakamura et al. | 717/173 |

* cited by examiner

Primary Examiner — Lan-Dai T Truong
(74) Attorney, Agent, or Firm — Rabin & Berdo, P.C.

(57) ABSTRACT

A firmware updating system and a method for updating the same are provided. The firmware updating system comprises an image updating device and an embedded device. The image updating device comprises a first storage device and a merging module. The first storage device is for storing a first header and a first file system. The merging system is for merging the first header and the first file system to output a first image file. The embedded device comprises a second storage device and a self-updating module. The second storage device is for storing a second image file. The second image file includes a second header, a second file system, and a third file system. The self-updating module is for updating the second file system of the second image file as the first file system according to the first image file.

24 Claims, 5 Drawing Sheets

FIRMWARE UPDATING SYSTEM AND METHOD FOR UPDATE THE SAME

This application claims the benefit of Taiwan application Serial No. 96132961, filed Sep. 4, 2007, the subject matter of which is incorporated herein by reference.

BACKGROUND OF THE INVENTION

1. Field of the Invention

The invention relates in general to a firmware updating system and a method for updating the same, and more particularly to a firmware updating system capable of self-updating a part of the file system and a method for updating the same.

2. Description of the Related Art

An embedded system is a computer system integrating software and hardware and has specific functions. The software of the embedded system, also called firmware, comprises an instruction set for performing specific functions, and has been widely used in many electronic devices such as personal digital assistant (PDA), telephone system, copier, elevator, and so on. As the application of the embedded system covers a wide range and the manufacturer is dedicated to further augmenting the functions of the embedded system, the updating of the firmware has thus become an important issue.

Most of the firmware is stored in a read-only memory (ROM). According to current method for updating the firmware, normally an electronic device is connected to a personal computer via a network interface card or a com port such as RS-232 first, and then a complete image file is downloaded to a random access memory (RAM) of the electronic device from the personal computer. Afterwards, the downloaded image file is compared with the original programming code, and the difference is written to the flash read-only memory for updating the firmware. According to some technologies, the downloading of the image file is concurrent with the updating of the programming code. Next, the electronic device is re-started for completing the updating of the firmware. However, the method of downloading the entire image file via the network and updating image file simultaneously will end up with error in updating if the connection of network is disconnected. Moreover, the contents of the image file may be changed and the security may be jeopardized. Therefore, according to most current methods, the programming code is not updated until the entire image file has been completely downloaded to the electronic device. However, this method of updating the firmware is disadvantaged by the following shortcomings.

Firstly, as an entire image file of the personal computer is transmitted to the embedded system via a corn port, the transmission time would increase relatively when the size of the firmware increases.

Secondly, as the entire image file is written to the random access memory for updating the firmware, the random access memory may lack of sufficient space, hence the system stability is deteriorated.

Thirdly, each time when the software is to be updated, the entire image file, including the programming code that does not need to be updated, is transmitted to the electronic device for comparison, hence resulting in unnecessary waste of time.

Fourthly, as the entire programming code of the embedded system is positioned at the same image file, the hardly updated part of the image file such as the kernel code or the boot code would also be transmitted to the electronic device for comparison, not only wasting frequency width but also deteriorating updating efficiency.

SUMMARY OF THE INVENTION

The invention is directed to a firmware updating system and a method for updating the same. The merging module of the image updating device outputs the to-be-updated first image file to the embedded device, and the self-updating module of the embedded device updates a part of the file system according to the first image file.

According to a first aspect of the present invention, a firmware updating system. The firmware updating system comprises an image updating device and an embedded device. The image updating device comprises a first storage device and a merging module. The first storage device is for storing a first header and a first file system. The merging module is for merging the first header with the first file system to output a first image file. The embedded device comprises a second storage device and a self-updating module. The second storage device is for storing a second image file. The second image file comprises a second header, a second file system and a third file system. The self-updating module is for updating the second file system of the second image file as the first file system according to the first image file.

According to a second aspect of the present invention, a firmware updating method is provided. The method is for updating a second image file of an embedded device. The second image file has a second header, a second file system and a third file system. The firmware updating method comprises the following steps. Firstly, the embedded device is connected to an image updating device, wherein the image updating device has a first header and a first file system. Next, the first header and the first file system are merged to form a first image file by an image updating device. Then, the first image file is outputted to the embedded device. Afterwards, the second file system of the second image file is updated as the first file system according to the first image file.

The invention will become apparent from the following detailed description of the preferred but non-limiting embodiments. The following description is made with reference to the accompanying drawings.

DETAILED DESCRIPTION OF THE INVENTION

Figure 1:
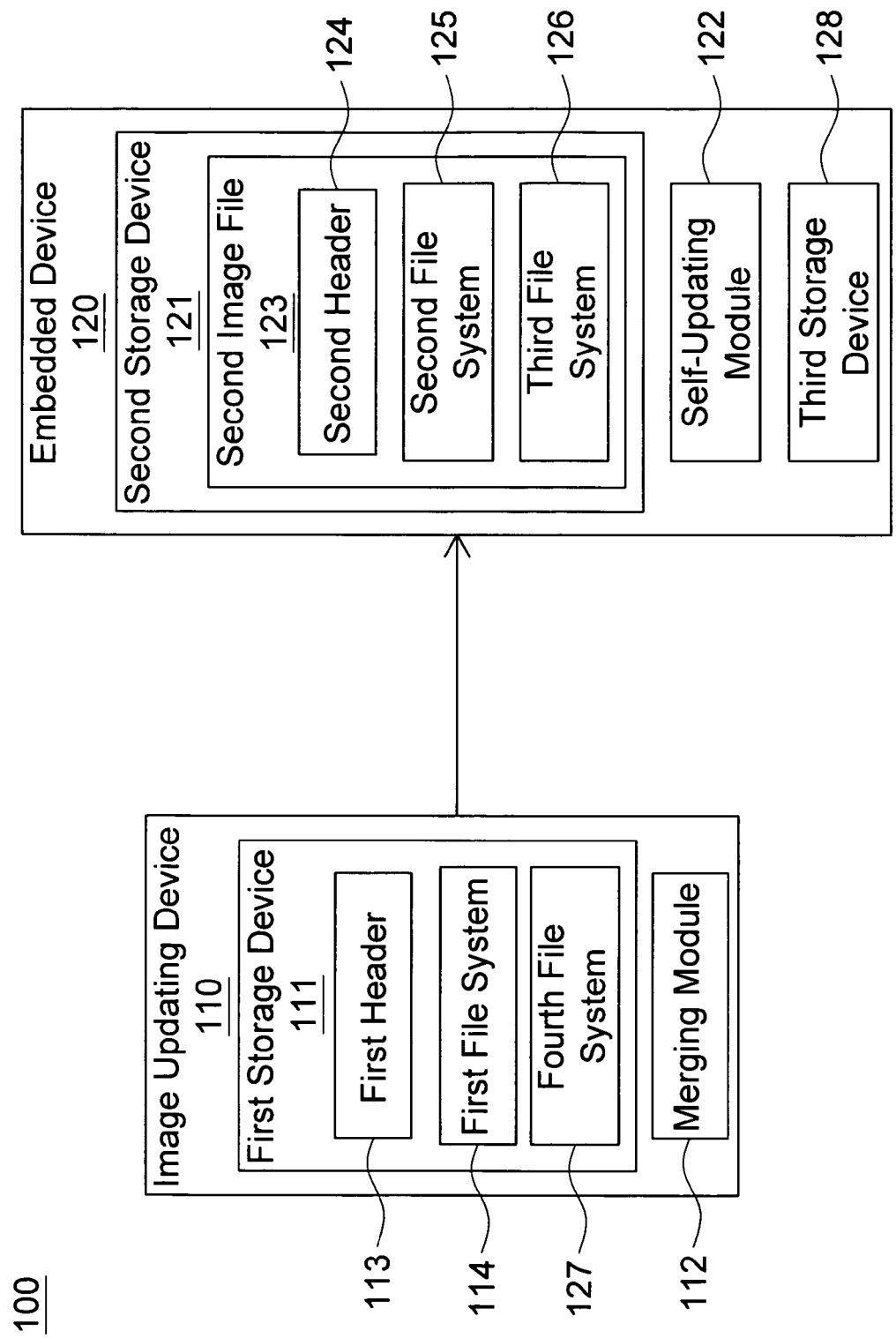
FIG. 1 is a perspective of a firmware updating system according to a preferred embodiment of the invention.

Referring to FIG. 1, a perspective of a firmware updating system according to a preferred embodiment of the invention is shown. The firmware updating system 100 comprises an image updating device 110 and an embedded device 120. The image updating device 110, such as a personal computer, comprises a first storage device 111 and a merging module 112. The first storage device 111 is for storing a first header 113 and a first file system 114. The first file system 114, such as a programming code, is to be updated by the embedded device 120. The first header 113 contains the information of the first file system 114. The merging module 112 is for comparing the programming code of the image updating device 110 with that of the embedded device 120, locating the programming code to be updated by the embedded device 120 as a first file system 114, and merging the first header 113 and the first file system 114 to output a first image file (not illustrated in the diagram) to the embedded device 120.

The embedded device 120 comprises a second storage device 121 and a self-updating module 122. The second storage device 121, such as a read-only memory (ROM), a flash read-only memory (flash ROM) or an electrically-erasable programmable read-only memory (EEPROM), is for storing a second image file 123. The second image file 123 has a second header 124, a second file system 125 and a third file system 126. The second file system 125 and the third file system 126, such as programming codes, preferably have different functions. The second header 124 contains the information of the second file system 125 and the third file system 126. In the present embodiment of the invention, the third file system 126 is the not-to-be-updated programming code of the second image file 123, and the second file system 125 is the to-be-updated programming code. After the image updating device 110 transmits the first image file to the embedded device 120, the self-updating module 122 updates the programming code of the second file system 125 as the first file system 114. Compared with the conventional firmware updating method, the firmware updating method of the present embodiment of the invention outputs only the to-be-updated part of the programming code to the embedded device 120 by the merging module 112, and updates the second file system 125 as the first file system 114 by the self-updating module 122, thereby the transmission time us saved and the updating efficiency is increased.

Besides, the embedded device 120 isolates the sub-roots of the file system that updated often such as /user, /lib or /lib/module. Therefore, forming the image file will not affect the location of other roots when the roots of the embedded device 120 are updated. Meanwhile, there is no need to transmit or update the file system of other roots.

Moreover, in the present embodiment of the invention, the embedded device 120 is directly connected to the image updating device 110 via a corn port such as RS-232 or universal serial bus (USB) for example. However, the embedded device 120 can also communicate with a trivial file transfer protocol (TFTP) server of the image updating device 110 via a network interface card (NIC).

Besides, in the present embodiment of the invention, the first storage device 111 further comprises a fourth file system 127 whose programming code is identical to that of the third file system 126. For example, the third file system 126 is the part of the second image file 123 hardly updated such as the kernel code or the boot code. As the programming code of the fourth file system 127 is identical to that of the third file system 126, the merging module 112 will not output the fourth file system 127 to the embedded device 120, thereby the transmission time is saved.

In the present embodiment of the invention, the embedded device 120 preferably further comprises a third storage device 128. After the embedded device 120 receives the first image file outputted from the image updating device 110, the first image file is stored in the third storage device 128 first, and then the embedded device 120 is re-started for updating the first image file to the second storage device 121. For example, the third storage device 128 is a dynamic random access memory (DRAM) or a double-data-rate synchronous dynamic random access memory (DDR SDRAM). Compared with conventional embedded device, the image updating device 110 only transmits the first file system 114 and the first header 113 that need to be updated to the third storage device 128 of the embedded device 120 for updating, thereby the space of the third storage device 128 is saved.

Furthermore, the self-updating module 122 accesses the first image file stored in the third storage device 128, and then updates the second file system 125 according to the first file system 114 of the first image file. Besides, the self-updating module 122 updates the second header 124 as a third header 131 (illustrated in FIG. 2A) according to the first file system 114 and the third file system 126, wherein the third header 131, the first file system 114 and the third file system 126 are a third image file 130 (illustrated in FIG. 2A).

Figure 2A:
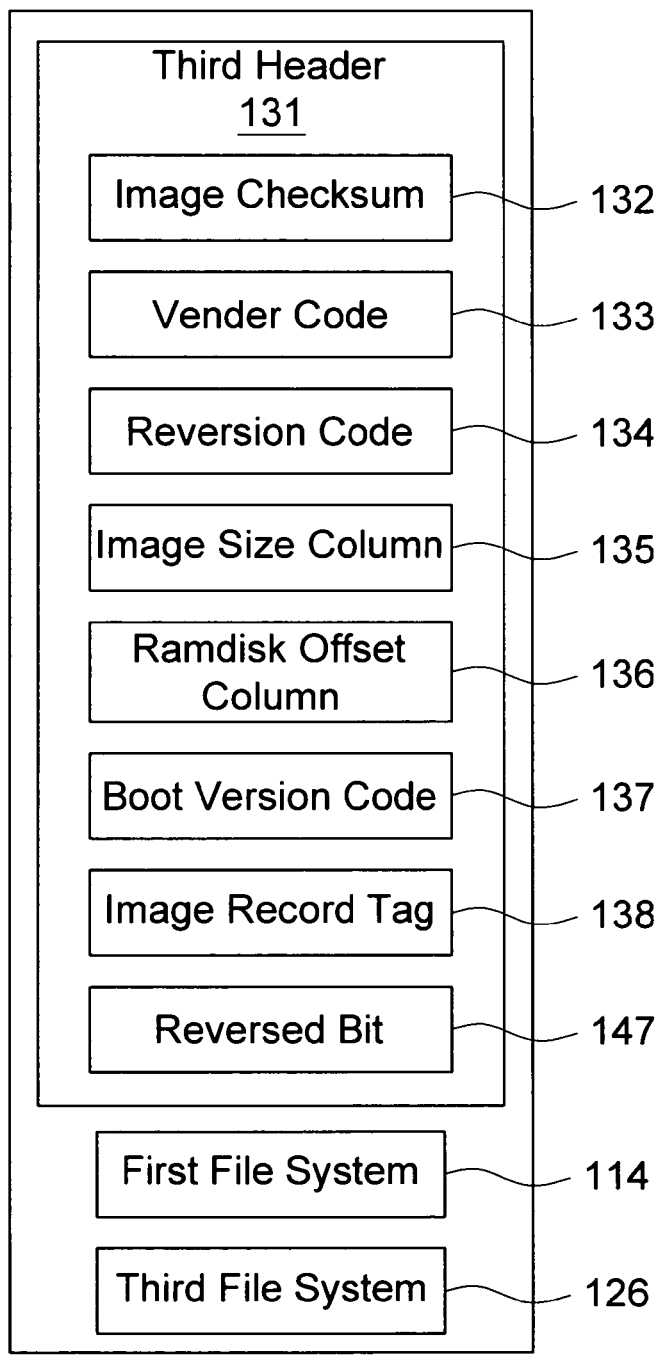
FIG. 2A is a perspective of a third image file.
Figure 2B:
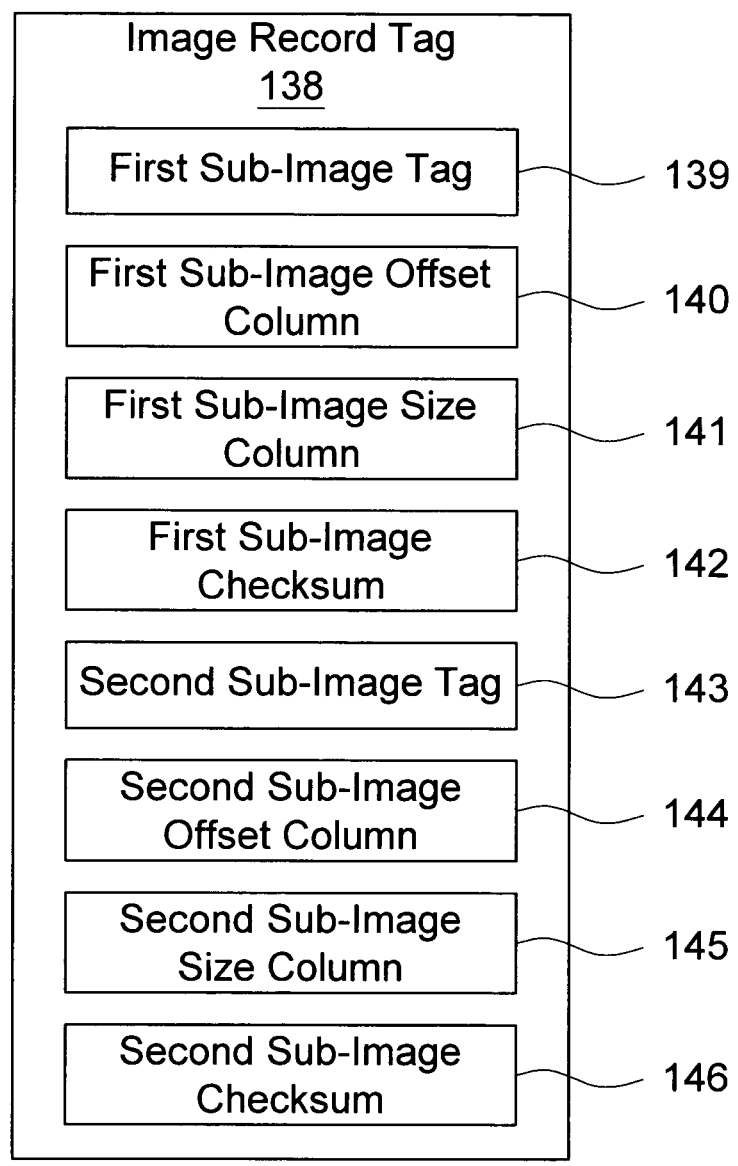
FIG. 2B is a perspective of the image record tag of FIG. 2A.

Referring to FIG. 2A and FIG. 2B. FIG. 2A is a perspective of a third image file. FIG. 2B is a perspective of an image record tag of FIG. 2A. As indicated in FIG. 2A, the third image file 130 includes a third header 131, a first file system 114 and a third file system 126. In the present embodiment of the invention, the third header 131 includes an image checksum 132, a vender code 133, a reversion code 134, an image size column 135, a ramdisk offset column 136, a boot version code 137, an image record tag 138 and a reversed bit 147.

The image checksum 132 is for checking the completeness of the third image file 130. The image checksum 132 has 4 bits for example, but the number of bits is not limited thereto.

The vender code 133 is for recording manufacturer information and is preferably a constant. In the present embodiment of the invention, the vender code 133 has 4 bits for example, but the number of bits is not limited thereto.

The reversion code 134 is for recording the reversion of the third image file 130 by which the merging module 112 determines whether the embedded device 120 is to-be-updated. In the present embodiment of the invention, the reversion code 134 has 4 bits, but the number of bits is not limited thereto.

The image size column 135 is for recording the size of the third image file 130. In the present embodiment of the invention, the image size column 135 has 4 bits, but the number of bits is not limited thereto.

The ramdisk offset column 136 is for recording the offset from the third header 131 to the boot code of the third image file 130. In the present embodiment of the invention, the ramdisk offset column 136 has 4 bits, but the number of bits is not limited thereto.

The boot version code 137 is for recording the reversion of the boot code of the third image file 130. In the present embodiment of the invention, the boot version code 137 has 4 bits, but the number of bits is not limited thereto.

The reversed bit 147 is for reversing the third header 131 to a fixed size. In the present embodiment of the invention, the reversed bit 147 reverses the third header 131 to 1024 bits. However, the reversed bit 147 may also be reversed to other number of bits.

The image record tag 138 is for recording the information of the first file system 114 and the third file system 126. As indicated in FIG. 2B, the image record tag 138 includes a first sub-image tag 139, a first sub-image offset column 140, a first sub-image size column 141, a first sub-image checksum 142, a second sub-image tag 143, a second sub-image offset column 144, a second sub-image size column 145 and a second sub-image checksum 146.

The first sub-image tag 139 and the second sub-image tag 143 are respectively for recording the designations of the first file system 114 and the third file system 126 to recognize the functions of the programming code. The first sub-image tag 139 and the second sub-image tag 143 respectively are a constant. In the present embodiment of the invention, the sub-image tags 139 and 143 respectively have 4 bits, but the number of bits is not limited thereto.

The first sub-image offset column 140 is for recording the offset from the third header 131 to the first file system 114; the second sub-image offset column 144 is for recording the offset from the third header 131 to the third file system 126. In the present embodiment of the invention, the sub-image offset columns 140 and 144 respectively have 4 bits, but the number of bits is not limited thereto.

The first sub-image size column 141 and the second sub-image size column 145 respectively are for recording the sizes of first file system 114 and the third file system 126. In the present embodiment of the invention, the sub-image size column 141 and 145 respectively have 4 bits, but the number of bits is not limited thereto.

The first sub-image checksum 142 and the second sub-image checksum 146 are respectively for checking the completeness of the first file system 114 and the third file system 126. In the present embodiment of the invention, the sub-image checksum 142 and 146 respectively have 4 bits, but the number of bits is not limited thereto.

In the present embodiment of the invention, the image record tag 138 has two sub-image tags (139 and 143), two sub-image offset columns (140 and 144), two sub-image size columns (141 and 145) and two sub-image checksums (142 and 146), but the exemplification is not for limiting the scope of technology of the invention. For example, in practical application, if the third image file 130 further comprises a fifth file system, then the image record tag 138 further comprises a third sub-image tag, a third sub-image offset column, a third sub-image size column and a third sub-image checksum.

Despite the present embodiment of the invention is exemplified by the third image file 130, however the data types of the first image file and the second image file 123 are preferably similar to that of the third image file 130. That is, the first image file and the second image file 123 respectively have an image checksum, a vender code, a reversion code, an image size column, a ramdisk offset column, a boot version code, an image record tag and a reversed bit, wherein the image record tag further includes a sub-image tag, a sub-image offset column, a sub-image size column and a sub-image checksum.

Figure 3:
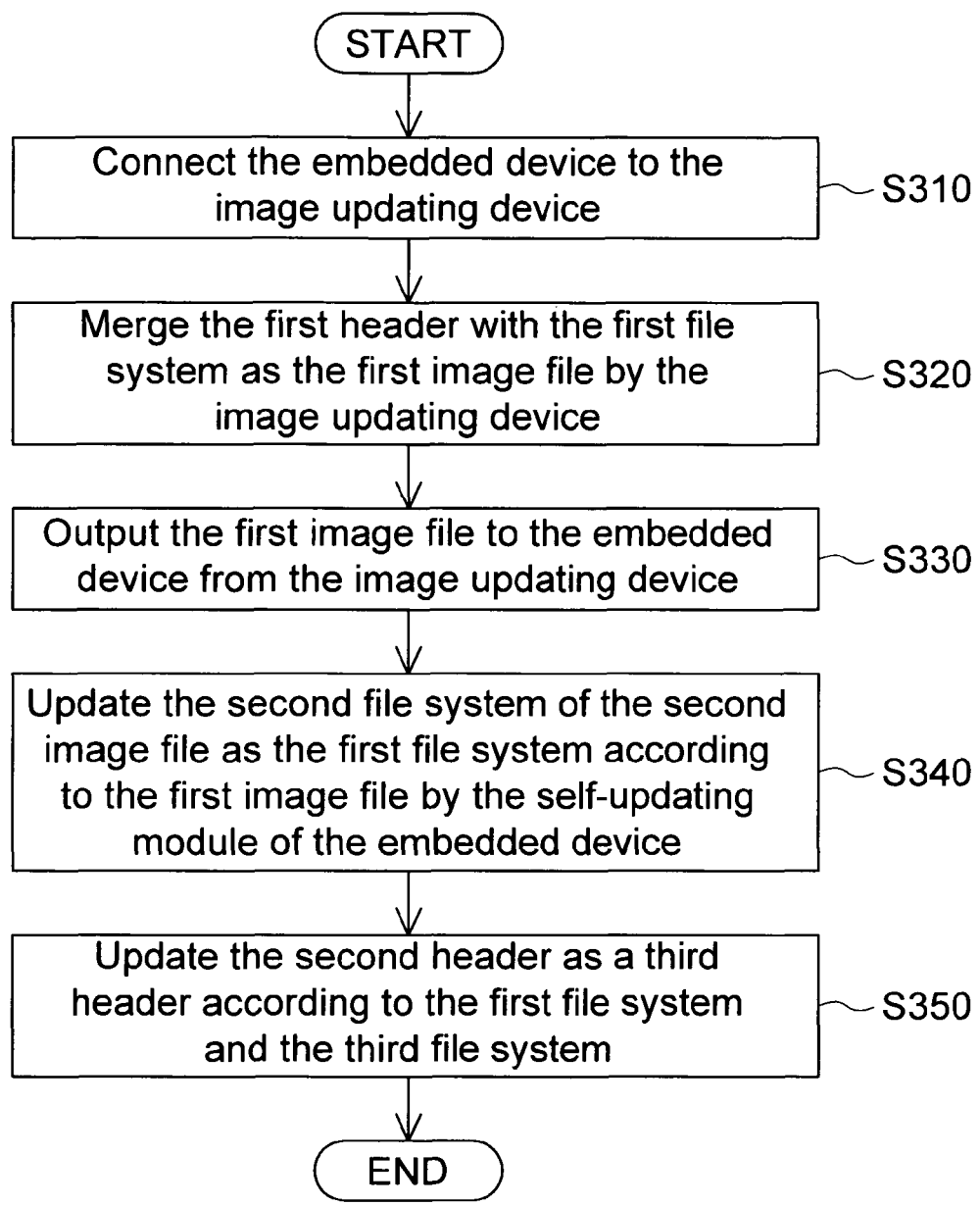
FIG. 3 is a flowchart of a firmware updating method according to a preferred embodiment of the invention.

The firmware updating method is disclosed below. Referring to FIG. 3, a flowchart of a firmware updating method according to a preferred embodiment of the invention is shown. Referring to the element designations of FIG. 1, FIG. 2A and FIG. 2B. The firmware updating method is for updating a second image file 123 of an embedded device 120, wherein the second image file 123 includes a second header 124, a second file system 125 and a third file system 126. The firmware updating method comprises the following steps.

Firstly, the method begins at step S310, the embedded device 120 is connected to an image updating device 110 comprising a first header 113 and a first file system 114, wherein the first header 113 contains the information of the first file system 114 as indicated in FIG. 1. The embedded device 120 is connected to the image updating device 110 via a corn port or a network interface card.

Afterwards, the method proceeds to step S320, the first header 113 and the first file system 114 are merged as a first image file by the image updating device 110 via a merging module 112.

Next, the method proceeds to step S330, the first image file is outputted to the embedded device 120 from the image updating device 110.

Then, the method proceeds to step S340, the second file system 125 of the second image file 123 is updated as the first file system 114 according to the first image file by the self-updating module 122 of the embedded device 120.

The firmware updating method only needs to merge the first file system 114 with the first header 113 as a first image file and further transmits the first image file to the embedded device 120 for updating, thereby the transmission time is reduced. Besides, the embedded device 120 only needs to update the second file system 125 as the first file system 114, thereby the updating time is reduced and the updating efficiency is increased.

Besides, in the step S320, the reversion code of first header 113 and the reversion code of second header 124 are preferably used as a reference for determining the updating. If the reversion code of the first header 113 is different from that of the second header 124, then the first header 113 and the first file system 114 are merged as a first image file.

Figure 4:
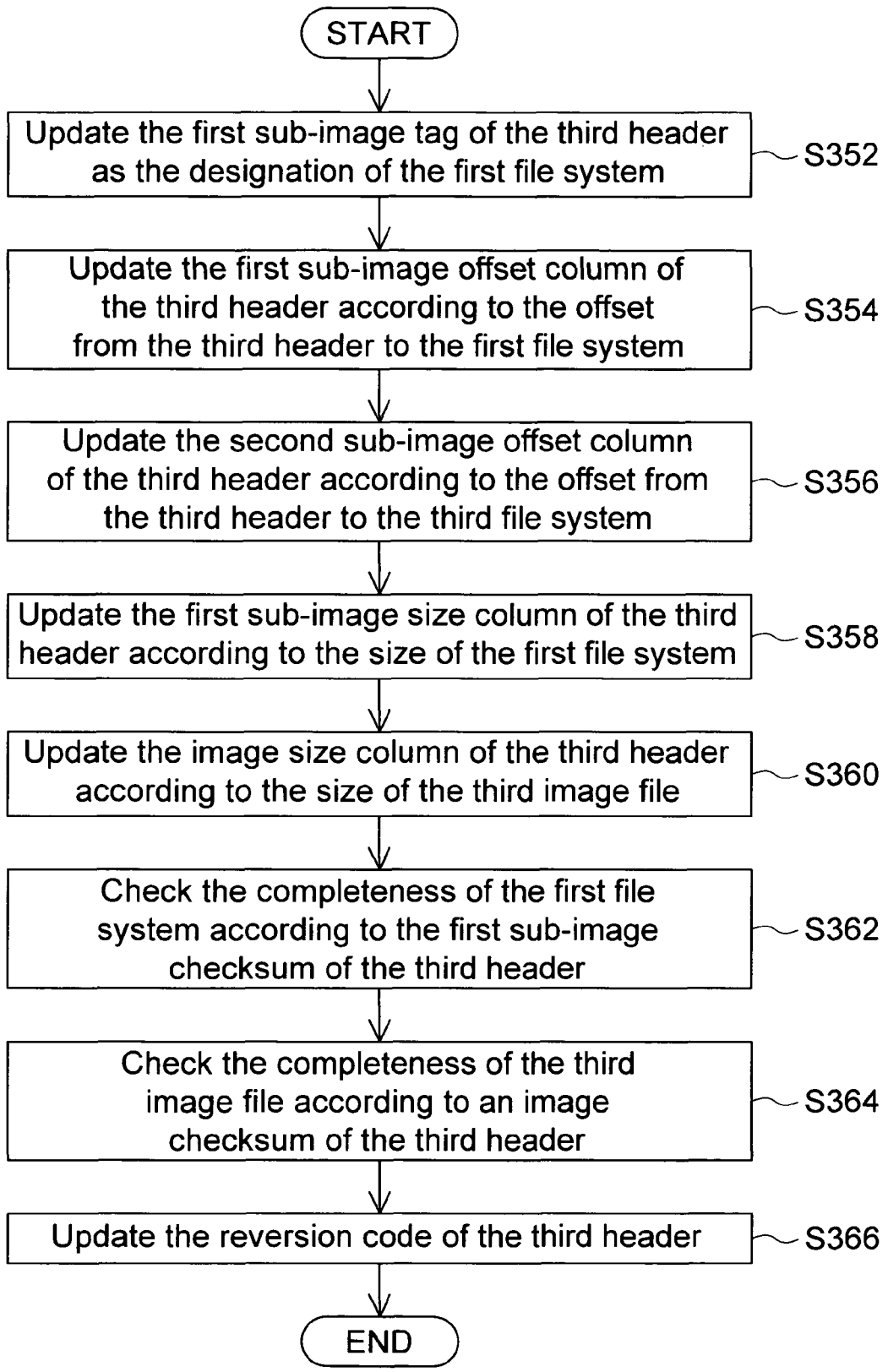
FIG. 4 is a detailed flowchart of the firmware updating method of FIG. 3.

Furthermore, in the present embodiment of the invention, the firmware updating method preferably further comprises step S350, the second header 124 is updated as a third header 131 according to the first file system 114 and the third file system 126 as indicated in FIG. 2A, wherein the third header 131, the first file system 114 and the third file system 126 are a third image file 130. Referring to FIG. 2A, FIG. 2B and FIG. 4. FIG. 4 is a detailed flowchart of the firmware updating method of FIG. 3.

As indicated in FIG. 4, step S350 preferably further comprises the following sub-steps. Firstly, the method proceeds to step S352, the first sub-image tag 139 of the third header 131 is updated as a designation of the first file system 114.

Next, the method proceeds to step S354, the offset from the third header 131 to the first file system 114 is calculated to update the first sub-image offset column 140 of the third header 131. As the embedded device 120 preferably has sequentially stored all of the file systems, when the second file system 125 is updated as the first file system 114, the storage position of the third file system 126 will change accordingly. Therefore, the method proceeds to step S356, the offset from the third header 131 to the third file system 126 is calculated to update the second sub-image offset column 144 of the third header 131.

Next, the method proceeds to step S358, preferably, the first sub-image size column 141 of the third header 131 is updated according to the size of the first file system 114. Besides, the method proceeds to step S360, preferably the image size column 135 of the third header 131 is updated according to the size of the third image file 130.

Afterwards, the method proceeds to step S362, after the second file system 125 is updated as the first file system 114, preferably the completeness of the first file system 114 is checked according to the first sub-image checksum 142 of the third header 131. Besides, the method proceeds to step S364, preferably the completeness of the third image file 130 is checked according to the image checksum 132 of the third header 131 to assure that the embedded device 120 can access and execute the third image file 130.

Then, the method proceeds to step S366, preferably the reversion code 134 of the third header 131 is updated. After that, the embedded device 120 can use the reversion code 134 as a reference of determining the updating.

According to the firmware updating system and the method for updating the same disclosed in the preferred embodiments of the invention, the merging module of the image updating device is used for merging and transmitting the file systems that need to be updated to the embedded device for updating, and then the self-updating module the embedded device is used for updating the file system, not only increasing the updating efficiency of the embedded device but also possessing the following advantages:

Firstly, the size of the to-be-updated file system is reduced. If the embedded device only needs to update a part of the file system, then the image updating device only needs to transmit a part of the file system to the embedded device for updating, hence the size of the to-be-updated file system is reduced effectively.

Secondly, the configuration is more flexible. The software engineers can configure the to-be-updated part or the to-be-changed part of the file system, hence the flexibility and the efficiency of developing of a system is increased.

Thirdly, the rate of transmission is increased. The image updating device only needs to transmit a part of the file system to the embedded device. Compared with the conventional updating method, the firmware updating system of the invention effectively increases the rate of transmission.

Fourthly, the frequency width is saved. If the image updating device is connected to the embedded device via a network interface card, hence transmitting only a part of the file system saves the frequency width.

Fifthly, capacity of the memory is saved. The embedded device only needs to store the to-be-updated part of the file system to a random access memory, hence the capacity of the memory of the embedded device is saved.

Sixthly, the algorithm calculating is reduced. The self-updating module of the embedded device only needs to compare the downloaded image file with the original image file, hence the algorithm calculating is reduced and the efficiency is increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A firmware updating system, comprises:
   an image updating device, comprising:
      a first storage device for storing a first header and a first file system; and
      a merging module for merging the first header with the first file system to output a first image file; and
   an embedded device, comprising:
      a second storage device for storing a second image file, wherein the second image file comprises a second header, a second file system and a third file system; and
      a self-updating module for updating the second file system of the second image file as the first file system according to the first image file;
   wherein the first storage device further comprises a fourth file system whose programming code is identical to that of the third file system.

2. The firmware updating system according to claim 1, wherein the self-updating module is for updating the second header as a third header according to the first file system and the third file system, and the third header, the first file system and the third file system are a third image file.

3. The firmware updating system according to claim 2, wherein the third header comprises:
   an image checksum for checking the completeness of the third image file.

4. The firmware updating system according to claim 2, wherein the third header comprises:
   a vender code for recording manufacturer information.

5. The firmware updating system according to claim 2, wherein the third header comprises:
   a reversion code for recording the reversion of the third image file.

6. The firmware updating system according to claim 2, wherein the third header comprises:
   an image size column for recording the size of the third image file.

7. The firmware updating system according to claim 2, wherein the third header comprises:
   a ramdisk offset column for recording the offset from the third header to the boot code of the third image file.

8. The firmware updating system according to claim 2, wherein the third header comprises:
   a boot version code for recording the reversion of the boot code of the third image file.

9. The firmware updating system according to claim 2, wherein the third header comprises:
   a reversed bit for reversing the third header to a fixed size.

10. The firmware updating system according to claim 2, wherein the third header comprises:
    an image record tag for recording the information of the first file system and the third file system.

11. The firmware updating system according to claim 10, wherein the image record tag comprises:
    a first sub-image tag for recording the designation of the first file system; and
    a second sub-image tag for recording the designation of the third file system.

12. The firmware updating system according to claim 10, wherein the image record tag comprises:
    a first sub-image offset column for recording the offset from the third header to the first file system; and
    a second sub-image offset column for recording the offset from the third header to the third file system.

13. The firmware updating system according to claim 10, wherein the image record tag comprises:
    a first sub-image size column for recording the size of the first file system; and
    a second sub-image size column for recording the size of the third file system.

14. The firmware updating system according to claim 10, wherein the image record tag comprises:
    a first sub-image checksum for checking the completeness of the first file system; and
    a second sub-image checksum for checking the completeness of the third file system.

15. A firmware updating method for updating a second image file of an embedded device, wherein the second image file has a second header, a second file system and a third file system, and the firmware updating method comprises:
    (a) connecting the embedded device to an image updating device, wherein the image updating device has a first header, a first file system and a fourth file system whose programming code is identical to that of the third file system;
    (b) merging the first header with the first file system as a first image file by the image updating device;
    (c) outputting the first image file to the embedded device; and
    (d) updating the second file system of the second image file as the first file system according to the first image file.

16. The firmware updating method according to claim 15, wherein the method further comprises:
    (e) updating the second header as a third header according to the first file system and the third file system;

wherein the third header, the first file system and the third file system are a third image file.

17. The firmware updating method according to claim 16, wherein the step (e) comprises:
(e-1) updating a first sub-image tag of the third header as the designation of the first file system.

18. The firmware updating method according to claim 16, wherein the step (e) comprises:
(e-2) updating a first sub-image offset column of the third header according to the offset from the third header to the first file system; and
(e-3) updating a second sub-image offset column of the third header according to the offset from the third header to the third file system.

19. The firmware updating method according to claim 16, wherein the step (e) comprises:
(e-4) updating a first sub-image size column of the third header according to the size of the first file system.

20. The firmware updating method according to claim 16, wherein the step (e) comprises:
(e-5) checking the completeness of the first file system according to a first sub-image checksum of the third header.

21. The firmware updating method according to claim 16, wherein the step (e) comprises:
(e-6) updating a reversion code of the third header.

22. The firmware updating method according to claim 16, wherein the step (e) comprises:
(e-7) updating an image size column of the third header according to the size of the third image file.

23. The firmware updating method according to claim 16, wherein the step (e) comprises:
(e-8) checking the completeness of the third image file according to an image checksum of the third header.

24. The firmware updating method according to claim 15, wherein the step (b) comprises:
(b-1) merging the first header with the first file system as the first image file if a reversion code of the first header is different from that of the second header.

* * * * *